United States Patent [19]

Yuhas

[11] 4,353,771
[45] Oct. 12, 1982

[54] PLY DOWN ASSEMBLY FOR TIRE BUILDING MACHINE

[75] Inventor: Gerald J. Yuhas, Quincy, Ill.

[73] Assignee: NRM Corporation, Akron, Ohio

[21] Appl. No.: 214,123

[22] Filed: Dec. 8, 1980

[51] Int. Cl.³ .......................................... B29H 17/22
[52] U.S. Cl. .................................. 156/403; 156/401; 269/275; 29/436; 29/437; 29/450
[58] Field of Search ............... 156/398, 399, 400–403, 156/414–420; 269/275, 281; 29/434, 436, 437, 450, 453, 521, 525

[56] References Cited

U.S. PATENT DOCUMENTS 2,998,049  8/1961  Winslow .............................. 156/401
3,438,832  4/1969  Cantarutti .......................... 156/401
4,238,268 12/1980  McGaughey ....................... 156/398

Primary Examiner—Edward C. Kimlin
Assistant Examiner—Lois E. Boland
Attorney, Agent, or Firm—Maky, Renner, Otto & Boisselle

[57] ABSTRACT

A tire building machine utilizes a ply-down and bead set assembly in which an array of axially projecting spring fingers are used. The fingers are secured between two nested rings which are constructed to interfit with each other and with each finger so that each finger may be inserted or removed without affecting adjacent fingers. One of the rings has projections interfitting with the fingers in their normal position and one of the rings may be locally deformable to assist in the insertion and removal of the fingers.

22 Claims, 7 Drawing Figures

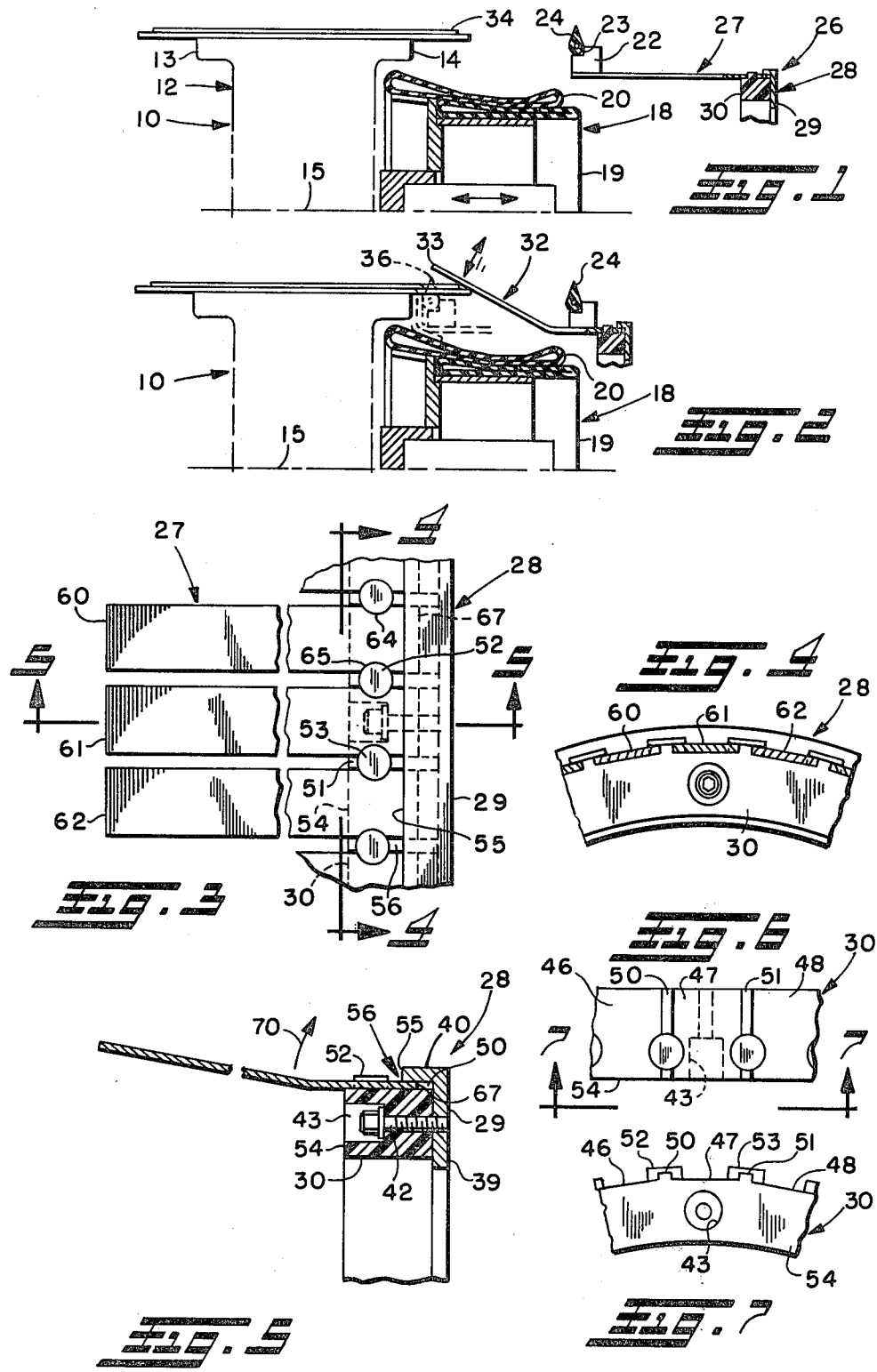

PLY DOWN ASSEMBLY FOR TIRE BUILDING MACHINE

This invention relates generally as indicated to a ply down assembly for a tire building machine and more particularly to a ply down and bead set assembly in which an array of axially projecting spring fingers are employed.

BACKGROUND OF THE INVENTION

Spring finger ply downs are generally employed at each axial end of the drum of a tire building machine. Such assemblies generally comprise an array of axially extending spring fingers which project toward the center of the drum and which in their unflexed condition extend at an angle radially outwardly. Such fingers are usually flexed inwardly by the axial movement of a bead setting device causing the ends thereof to sweep or fold inwardly liner or ply material overhanging the ends of the drum. In this manner the materials of the tire are turned down over the shoulder or edge of the drum to form a shoulder of tire material rigidly backed by the edge or shoulder of the drum to receive the tire bead. Thereafter with the bead setter and ply down assembly retracted, the ply material will normally be turned and stitched around the bead and up over the top of the drum by a dual bladder assembly such as seen, for example, in Cantarutti U.S. Pat. No. 3,438,832, or the copending application of George E. Enders entitled "Tire Building Machine" Ser. No. 122,605, filed Feb. 19, 1980.

A problem arises in spring finger ply down assemblies in that they are difficult to assemble and it is also difficult to replace a finger which may become damaged or bent. As an analogy, the problem is similar to trying to assemble a barrel without special tools or jigs, or trying to replace a single barrel stave without affecting adjacent barrel staves. Usually the fingers are clamped between two rings but to assemble the fingers or remove a single finger requires the rings to be separated sufficiently to accomplish the purpose. This is difficult to do without affecting or loosening adjacent fingers.

SUMMARY OF THE INVENTION

It is accordingly a principal object of the present invention to provide a spring finger ply down where assembly and maintenance are greatly facilitated.

Another important object is the provision of such assembly wherein the fingers can individually quickly be removed or reinserted without affecting adjacent fingers.

A similar object is the provision of such assembly wherein the fingers may be inserted, or removed, without requiring the disassembly of parts.

Another object is the provision of a spring finger assembly for a tire building machine wherein the fingers may be assembled, removed, or replaced, without the requirement of special tools.

Still another object is the provision of a tire building machine incorporating a spring finger ply down wherein down time for maintenance or repair is greatly reduced.

With the present invention a simple two ring ring assembly is provided to secure the fingers, one ring fitting within the other. One ring has projections interfitting with the fingers and one or the other may be locally deformable to enable the fingers to be bent for insertion or removal without affecting adjacent fingers.

A yet further object is the provision of such nested ring mounting assembly wherein one of such rings is locally deformable.

A further object is the provision of a nested ring mounting assembly for such fingers, one of which rings has projections interfitting with the fingers.

Other objects and advantages of the present invention will become apparent as the following description proceeds.

To the accomplishment of the foregoing and related ends the invention then comprises the features hereinafter fully described and particularly pointed out in the claims, the following description and the annexed drawings setting forth in detail certain illustrative embodiments of the invention these being indicative, however, of but a few of the various ways in which the principles of the invention may be employed.

BRIEF DESCRIPTION OF THE DRAWINGS

In said annexed drawings:

FIG. 1 is a schematic quarter section of a tire building machine incorporating a spring finger ply down of the present invention;

FIG. 2 is a view similar to FIG. 1 illustrating the fingers in position just prior to the ply down operation and showing in dotted lines the turned down plys and the bead being set;

FIG. 3 is an enlarged fragmentary outside radial elevation of the ply down assembly;

FIG. 4 is a radial section of the assembly taken substantially on the line 4—4 of FIG. 3.

FIG. 5 is an axial section of the assembly taken substantially on the line 5—5 of FIG. 3;

FIG. 6 is a fragmentary radial elevation of one of the rings of the assembly; and FIG. 7 is a corresponding axial elevation of the ring fragment seen in FIG. 6 as seen from the line 7—7 thereof.

DETAILED DESCRIPTION OF THE ILLUSTRATED PREFERRED EMBODIMENT

Referring first to FIGS. 1 and 2 there is illustrated a tire building machine shown generally at 10. The machine illustrated is a first stage machine which simply constructs the tire band which may later be shaped to a toroid or tire shape on a second stage machine where other components such as a belt or tread are assembled. It will, however, be appreciated that the present invention may be utilized with other types of tire building machines such as a single stage machine wherein the band is both formed and shaped.

In any event, the machine includes a conventional tire building drum 12 which may be radially expanded and contracted. The drum is provided with two axially oppositely extending shoulders seen at 13 and 14. The drum is rotatable on shafting shown schematically at 15.

At each end of the drum there is provided a dual bladder turn up assembly as seen at 18, each assembly being movable axially of the machine. The dual bladder assembly includes an inner bladder 19 and an outer bladder 20. In the uninflated condition of such bladders they lie generally flat and beneath the extending shoulder 14.

Also shown is a bead setter 22 which includes a shoulder or shelf 23 adapted to receive the bead 24. The bead setter ring or assembly 22 is also movable axially of the machine.

Also shown is the spring finger ply down assembly 26. The spring finger ply down assembly 26 includes an axially projecting array of spring fingers 27 which project axially toward the drum 12 inside of the bead setting ring 22. The fingers are mounted at their proximal end on a ring mounting assembly shown generally at 28 which comprises nested rings 29 and 30.

The mounting assembly and thus the spring finger ply down is mounted for movement axially of the drum as is the bead setting ring and the dual bladder assembly. It will be appreciated that a dual bladder assembly, bead setting assembly and spring finger ply down will also be provided on the opposite end of the drum although not illustrated in FIGS. 1 and 2.

The spring fingers in their normal or unflexed condition extend axially and then radially outwardly as indicated at 32 in FIG. 2 so that the distal ends 33 are positioned radially outwardly of the overhanging plys 34. In such unstressed state of the fingers they form a generally axially projecting cone, with the overhanging plys within the cone.

Then, as seen in FIG. 2, when the bead setting ring 22 moves axially toward the drum end to set the bead, the distal ends 33 of the fingers are moved radially inwardly to sweep the ply ends inwardly over the drum end 14. The bead 24 is then set against the plys which are then folded over the drum shoulder as seen in phantom lines at 36. The bead setting ring and ply down assembly are then retracted to the position seen in FIG. 1 and the dual bladder assembly 18 is inflated to turn and stitch the plys up over the bead.

Referring now to FIGS. 3, 4 and 5 it will be seen that the rings 29 and 30 are nested with the ring 29 being metallic and including a radially extending leg 39 as well as an axially extending outer somewhat shorter leg 40. The leg or flange 40 extends toward the end of the drum in ring form. The ring 29 may be connected to a support movable axially of the tire building machine.

Nested within the flange 40 of the ring 29 is ring 30, such rings being interconnected by fasteners 42 extending through holes in the ring 30 provided with the recessed counterbores 43 accomodating the heads in the recessed fashion illustrated while still providing a large bearing area for the fastener head.

It is noted that the ring 30 extends axially substantially beyond the flange 40 and is provided on its outer surface with a series of axially extending flats seen more clearly at 46, 47 and 48 in FIGS. 6 and 7. Such flats extend between axially extending ribs seen at 50 and 51. Each rib is provided with a circular projection as seen at 52 and 53, the centers of which are aligned with the respective ribs. Such projections extend slightly beyond the ribs and are offset toward what may be termed the front or projecting edge 54 of the ring 30. In such offset position, the projections 52 are also forward of the front edge 55 of the flange 40 of the ring 29, leaving a slight gap as seen at 56.

As seen more clearly in FIGS. 3 and 4 the array of spring fingers 27 includes individual fingers such as seen at 60, 61 and 62, each of which includes lateral circular edge notches which are transversely aligned as seen at 64 and 65. Such notches are designed to mate with the sides of the projections 52, 53, etc. In their attached position, the proximal end 67 of each finger extends beneath the flange 40.

In the assembled position of the fingers between the nested rings, the fingers will be firmly held against axial displacement because of the interfitting projections and notches. Such fingers will also be held because of the snug fit between the flange 40 and the opposed flat on the exterior of the ring 30.

However, in order to remove a finger it is simply bent manually in the direction of the arrow 70 seen in FIG. 5 to cause the notch to clear the top of the projection so that the finger can be pulled to the left as seen in FIG. 5 for removal. A single finger can be inserted in the same way by reversing the process. Removal and insertion in this manner may be accomplished without affecting adjacent fingers or without the use of tools.

In order to assist the insertion or removal of a single finger, the ring may be made of a locally deformable material such as a polyurethane elastomer having a durometer hardness of from about 85 to about 95 Shore A.

The projections and ribs on the exterior of the ring 30 lock the fingers in place and maintain their proper spacing and alignment when assembled.

With an array of fingers comprising as many as 40 or more individual fingers, on each end of the tire building machine, it can be seen that a spring finger ply down assembly is provided which may be assembled in the manner indicated by first assembling the rings 29 and 30, or in which the individual fingers may be removed and replaced without affecting adjoining fingers. Such assembly considerably reduces both assembly time and machine down time for maintenance or repair.

I claim:

1. A ply down assembly for a tire building machine comprising a metal L-shape ring including an axially extending leg, a plastic ring secured to said metal ring and including an axially extending surface cooperating with said axially extending leg, spring fingers secured between said leg and said surface, said ring including finger retaining means which permit removal or insertion of said fingers upon flexure of said fingers without disassembly of said plastic and metal rings.

2. An assembly as set forth in claim 1 wherein said finger retaining means includes projections on said surface interfitting with said fingers.

3. An assembly as set forth in claim 2 wherein said projections extend radially from said surface axially beyond said leg.

4. An assembly as set forth in claim 1 or 3 wherein said plastic ring is deformable.

5. An assembly as set forth in claim 1 including flats on said axially extending surface adapted to receive said fingers.

6. An assembly as set forth in claim 5 including axially extending ribs between said flats to maintain respective fingers therebetween.

7. An assembly as set forth in claim 6 wherein said finger retaining means comprise projections extending from said ribs and interfitting with said fingers in the secured position thereof.

8. An assembly as set forth in claim 7 wherein said fingers include lateral notches interfitting with said projections in such secured position but clearing such projections when flexed.

9. An assembly as set forth in claim 8 wherein said projections extend radially from said plastic ring axially beyond the edge of the leg of the metal ring.

10. A ply down assembly for a tire building machine comprising a pair of concentric rings, an array of spring fingers secured between and projecting generally axially from said pair of rings, radially extending projections extending from one of said rings interfitting with said fingers, one of said rings including deformable means permitting each finger to be bent to clear the interfitting projection for insertion in and removal from said assembly.

11. An assembly as set forth in claim 10 wherein said one of said rings is locally deformable yet sufficiently rigid as a whole to permit finger insertion or removal without affecting adjacent fingers.

12. An assembly as set forth in claim 11 wherein said one of said rings is polyurethane elastomer.

13. A ply down assembly for a tire building machine comprising a pair of concentric radially nested inner and outer rings, an array of spring fingers secured between and projecting axially from said pair of rings, one of said rings projecting axially beyond said other ring and including radial projections interfitting with said fingers, the radial extent of said projections and the axial distance of said projections from the said other ring permitting said fingers to be flexed adjacent said rings to clear said projections for individual insertion and removal.

14. An assembly as set forth in claim 13 wherein said outer ring is said other ring.

15. An assembly as set forth in claim 14 wherein said outer ring is L-shape.

16. An assembly as set forth in claim 15 wherein said one ring is locally deformable.

17. An assembly as set forth in claim 16 wherein the individual fingers of said array include edge notches interfitting with said projections.

18. An assembly as set forth in claim 17 including finger separating ribs on said one ring.

19. An assembly as set forth in claim 18 including flats between said ribs accomodating the fingers in a snug fit between the nested rings.

20. An assembly as set forth in claim 13 wherein said one ring is locally deformable.

21. An assembly as set forth in claim 20 including finger separating ribs on said one ring.

22. An assembly as set forth in claim 21 including flats between said ribs accomodating the fingers in a snug fit between the nested rings.

* * * * *